Oct. 23, 1945.  G. W. ROCHWALD  2,387,297
ABRADING WHEEL
Filed June 22, 1944   2 Sheets-Sheet 1.
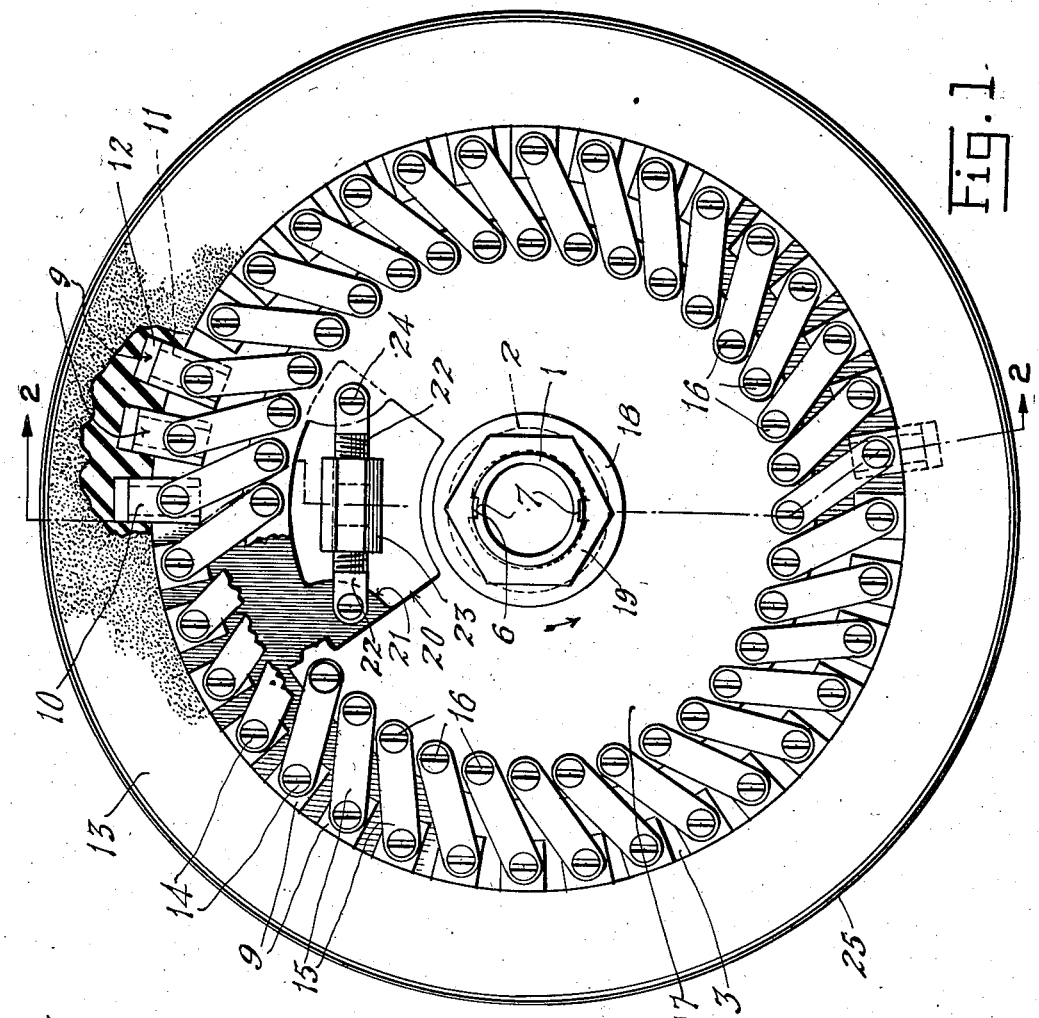
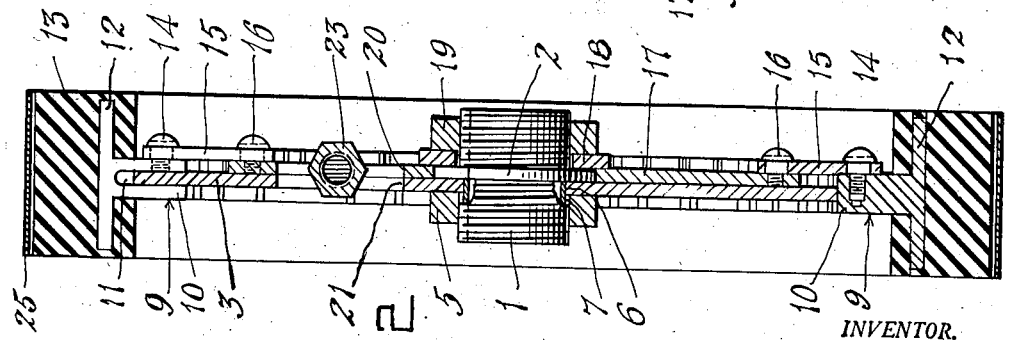
INVENTOR.
GEORGE W. ROCHWALD
BY
ATTORNEY.

Oct. 23, 1945.   G. W. ROCHWALD   2,387,297
ABRADING WHEEL
Filed June 22, 1944   2 Sheets-Sheet 2
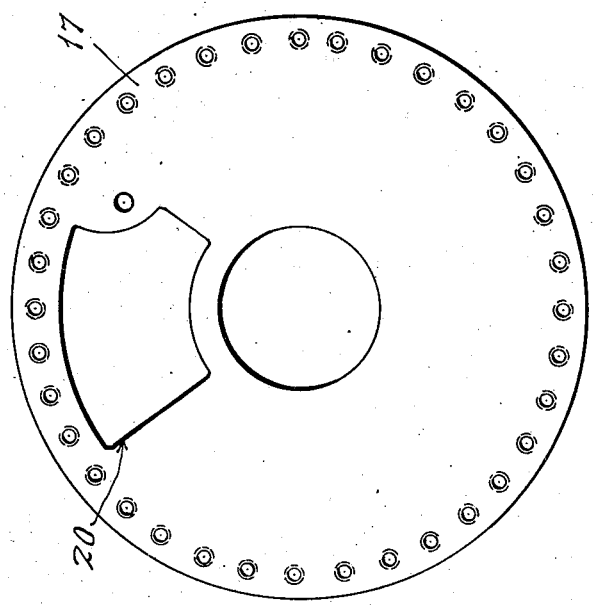
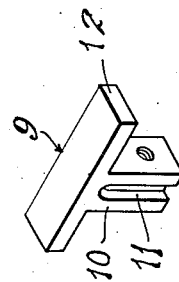
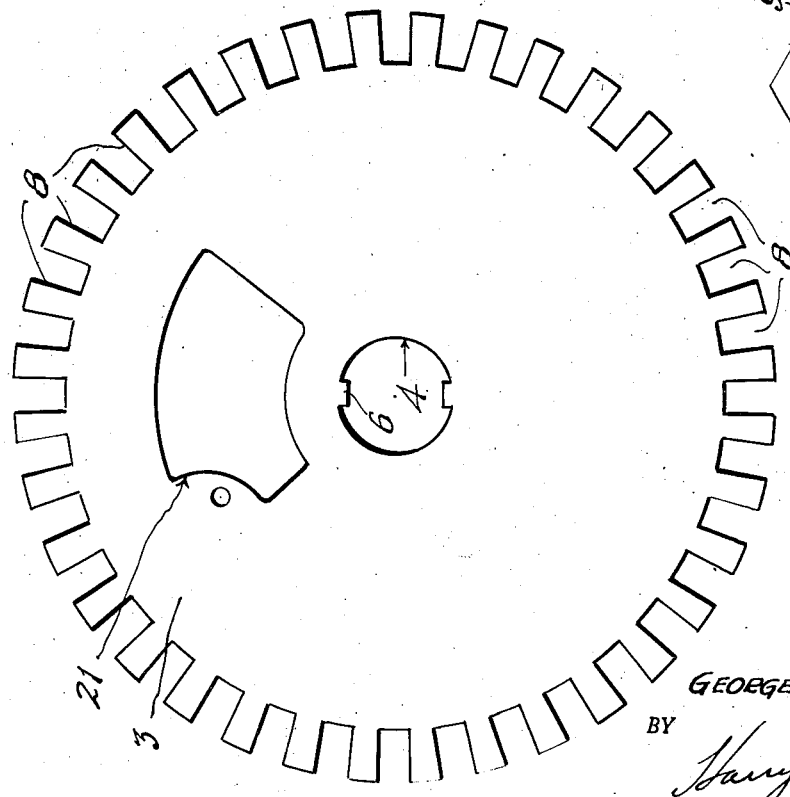
INVENTOR.
GEORGE W. ROCHWALD
BY
Harry B. Cook,
ATTORNEY Patented Oct. 23, 1945

2,387,297

UNITED STATES PATENT OFFICE 2,387,297

ABRADING WHEEL

George W. Rochwald, Kearny, N. J.

Application June 22, 1944, Serial No. 541,486

11 Claims. (Cl. 51—190)

This invention relates in particular to abrading, buffing or polishing wheels of the type which comprises an elastic or expansible rim or annulus mounted on a supporting body in which there is means for expanding and contracting the rim to secure upon and release from the periphery of said rim, respectively an endless treating band for abrading or other purposes.

Several forms of wheels of this type are described and claimed in my copending application Serial No. 526,547 and are described as including a body having a plurality of thrust members radially movable thereon and each connected to an expansible rim, in combination with means for simultaneously actuating all of said thrust members radially in opposite directions to expand and to contract said expansible rim respectively.

One object of the present invention is to provide an abrading wheel of this character which shall embody novel and improved means for mounting the thrust members on the body and for simultaneously actuating all of said thrust members radially in opposite directions on the body, whereby the wheels shall be simple and inexpensive in construction and durable in operation.

Another object is to provide in such a wheel novel and improved means for actuating the thrust members whereby they shall be at all times positively held in adjusted position but can be easily and quickly adjusted inwardly or outwardly of the wheel gradually and to any desired extent.

Other objects, advantages and results of the invention will be brought out by the following description in conjunction with the accompanying drawings in which Figure 1 is a front elevational view of an abrading wheel embodying my invention, with portions broken away and shown in section for clearness in illustration.

Figure 2 is a transverse vertical sectional view on the line 2—2 of Figure 1.

Figure 3 is a detached plan view of one of the body sections of the wheel.

Figure 4 is a similar view of the other body section and

Figure 5 is a detached perspective view of one of the thrust members.

Specifically describing the invention, the wheel includes a body which comprises a tubular hub 1 to be applied to the shaft of a motor or other suitable driving mechanism. Upon the hub is a circumferential rib or flange 2 which is rigidly, for example, integrally, connected to the hub, and at opposite sides of the flange 2, the hub is screw threaded. Mounted on the hub is a body section 3 which is shown in the form of a flat disc of metal having a central opening 4 through which the hub extends, and the disc is clamped tightly against one side of the flange 2 by a nut 5 which is screw threaded on the hub. Desirably the disc has one or more lugs 6 projecting into the opening 4 which engage longitudinal grooves or keyways 7 in the hub to positively cause the disc to rotate with the hub.

The disc 3 has a plurality of equidistantly circumferentially spaced slots 8 which open through its periphery and in each of which is slidably mounted a thrust member 9 to move radially of the disc. As shown, each thrust member is in the form of a die casting and includes a shank 10 which has a longitudinal groove in each of opposite sides thereof to receive and embrace the disc 3 at opposite edges of one of the slots 8. At one end of the shank is a head 12 which is embedded in an expansible rim or annulus 13 which preferably constitutes a ring or rubber and is coaxial with the disc.

The other end of the shank of each thrust member is pivotally connected to the means for moving the thrust members inwardly and outwardly of the wheel body. As shown, each thrust member is pivotally connected at 14 to one end of a link 15, the other end of which is pivotally connected at 16 to a second body section 17 which also comprises a circular disc of metal of a diameter less than that of the disc 3. This second disc 17 is rotatably mounted on the flange 2 of the hub in side-by-side closely spaced relation to the disc 3 and is held against longitudinal movement on the hub by engagement at one side with the disc 3 and by a spacer or washer 18 which abuts the other side of the disc and is clamped against the flange 2 by a nut 19 which is screw-threaded on the hub. The disc 17 is of a somewhat less thickness than the flange 2 so that there will be no binding action on the disc from the disc 3 and the spacer 18.

With this construction, it will be observed that normally the expansible rim 13 is contracted as shown in Figure 1 and the links 15 are inclined to radial lines of the body, but upon rotation of the disc 17 in the direction of the arrow in Figure 1, the links will be actuated so as to move them longitudinally outwardly of the body and thereby exert outward pressure on the thrust members 9 and the rim 13. This in turn will expand said rim.

For rotating the disc 17, I have shown an operating element which is extensible and contractible and has one end engaging an abutment upon each of the discs 3 and 17 so that upon extension and contraction of said operating element, said discs will be relatively rotated in opposite directions respectively. More particularly, the disc has a hole 20 extending transversely therethrough which is partially in register with a similar hole 21 in the other disc 3 and the operating element comprises two screw-threaded rods or bolts 22 one of which is preferably threaded right-hand while the other is threaded left-hand, and the threaded ends of these bolts are connected by a nut or turnbuckle 23. The other end of one of the bolts 22 is bifurcated so as to embrace the disc 17 at one edge of the hole 20, and the other bolt 22 is similarly bifurcated but embraces the disc 3 at the edge of the hole 21 opposite the edge of the hole 20 which the first-mentioned bolt embraces. Preferably the bolts 22 are pivotally connected at 24 to their respective discs so as to positively and rigidly connect the two discs together.

With this construction, it will be observed that upon rotation of the nut or turnbuckle 23 in opposite directions, the discs 17 and 3 will be relatively rotated in opposite directions respectively so as to expand or contract the rim 13. This action is such that the rim may be expanded or contracted gradually and to any desired extent and will be positively held in each adjusted position.

From the foregoing it will be understood that the rim can be easily and quickly contracted and expanded to permit application and removal of endless treating bands 25, such as bands having emery powder or sand on their outer surfaces. As is known in the art such bands generally have an internal diameter approximately equal to the external diameter of the expansible rim when the latter is contracted, so that when the rim is expanded it will tightly grip the band and hold it firmly against movement on the rim.

The invention permits the use of a large number of closely circumferentially spaced thrust members and also provides for a firm but smoothly operating mounting of the thrust members on the wheel body. The turnbuckle and bolts 23 and 22 are easily operable by relatively unskilled persons, and the positive connection of the two discs afforded by them ensures that the wheel will firmly resist the effects of centrifugal force on the expansible rim, thrust members and links. Consequently the outer peripheral surface of the rim and therefore the surface of the treating band will be substantially truly circular at all times.

What I claim is:

1. An abrading wheel of the character described, comprising two coaxially relatively rotatable body sections, an expansible rim coaxial with said body sections, a plurality of thrust members radially slidably mounted on one of said body sections and each connected at its outer end to said rim, and a link pivotally connected to each thrust member and to the other of said body sections so that upon relative rotation of said body sections in opposite directions said links will be actuated longitudinally outwardly and inwardly respectively to expand and contract said rim, and an operating element for causing relative rotation of said body sections.

2. An abrading wheel of the character described, comprising two coaxially rotatable body sections, an expansible rim coaxial with said body sections, a plurality of thrust members radially slidably mounted on one of said body sections and each connected at its outer end to said rim, and a link pivotally connected to each thrust member and to the other of said body sections so that upon relative rotation of said body sections in opposite directions said links will be actuated longitudinally outwardly and inwardly respectively to expand and contract said rim, and a longitudinally extensible and contractible operating element having one end engaging each of said body sections so that upon extension and contraction of said operating element said body sections will be relatively rotated in opposite directions respectively.

3. The wheel set forth in claim 2 wherein said operating element includes two bolts connected by a turnbuckle.

4. The wheel set forth in claim 2 wherein said operating element includes two bolts connected by a turnbuckle and the free ends of said bolts are pivotally connected to the respective body sections.

5. The wheel set forth in claim 1 wherein each body section has an abutment in opposed relation to the abutment on the other section, and said operating element is extensible and contractible and interposed between said abutments.

6. The wheel set forth in claim 1 wherein said body sections are arranged in side-by-side closely spaced relation to each other, each thereof has a hole therethrough partially in register with the hole in the other section, and said operating element is extensible and contractible and is interposed between the edge of one of said holes and the opposite edge of the other hole.

7. The wheel set forth in claim 1 wherein said body sections are arranged in side-by-side closely spaced relation to each other, each thereof has a hole therethrough partially in register with the hole in the other section, and said operating element including a turnbuckle.

8. The wheel set forth in claim 1 wherein said body sections are arranged in side-by-side closely spaced relation to each other, each thereof has a hole therethrough partially in register with the hole in the other section, said operating element comprises two screw-threaded elements and a nut connecting them in longitudinal alinement with each other, the free ends of said elements being bifurcated and embracing the said body sections respectively at the edge of one of said holes and at the opposite edge of the other hole.

9. The wheel set forth in claim 1 wherein said body sections are arranged in side-by-side closely spaced relation to each other, each thereof has a hole therethrough partially in register with the hole in the other section, said operating element comprises two screw-threaded elements and a nut connecting them in longitudinal alinement with each other, the free ends of said elements being bifurcated and embracing the said body sections respectively at the edge of one of said holes and at the opposite edge of the other hole, and with the addition of means pivotally connecting said ends of said elements to said body sections.

10. A wheel of the character described including a flat circular disk having a plurality of radial slots running through its periphery, a thrust member in each slot having a groove in each of opposite sides slidably embracing said disk at one edge of the corresponding slot, a hub located centrally in said disk, a second disk on said hub, one of said disks being rigidly connected to said hub and the other disk being rotatable on said hub, and a link pivotally connected to each thrust member and to the second-mentioned disk so that upon relative rotation of said disks in opposite directions, said links will be moved longitudinally inwardly and outwardly respectively to expand and contract said rim.

11. A wheel of the character described including a flat circular disk having a plurality of radial slots running through its periphery, a thrust member slidably mounted in each slot, a hub located centrally in said disk, a second disk on said hub, one of said disks being rigidly connected to said hub and the other disk being rotatable on said hub, and a link pivotally connected to each thrust member and to the second-mentioned disk so that upon relative rotation of said disks in opposite directions, said links will be moved longitudinally inwardly and outwardly respectively to expand and contract said rim.

GEORGE W. ROCHWALD.